US011214319B2

(12) United States Patent
Piens et al.

(10) Patent No.: US 11,214,319 B2
(45) Date of Patent: *Jan. 4, 2022

(54) RUBBER TRACK UNIT FOR VEHICLE

(71) Applicant: CNH Industrial America LLC, New Holland, PA (US)

(72) Inventors: Patrick Piens, Destelbergen (BE); Jean-Pierre Vandendriessche, Erpe-Mere (BE); Carlos J. A. Verheye, Roeselare (BE)

(73) Assignee: CNH Industrial America LLC, New Holland, PA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/424,800

(22) Filed: May 29, 2019

(65) Prior Publication Data
US 2019/0276101 A1    Sep. 12, 2019

Related U.S. Application Data

(63) Continuation of application No. 14/896,206, filed as application No. PCT/EP2014/061648 on Jun. 5, 2014, now Pat. No. 10,308,296.

(30) Foreign Application Priority Data

Jun. 5, 2013  (BE) .................. 2013/0395

(51) Int. Cl.
B62D 55/10    (2006.01)
B62D 55/088   (2006.01)
B62D 55/15    (2006.01)

(52) U.S. Cl.
CPC ........... B62D 55/10 (2013.01); B62D 55/088 (2013.01); B62D 55/15 (2013.01)

(58) Field of Classification Search
CPC ...... B62D 55/10; B62D 55/104; B62D 55/14; B62D 55/15; B62D 55/088; B62D 55/0882; B62D 55/112; B62D 55/30
See application file for complete search history.

(56) References Cited

U.S. PATENT DOCUMENTS 1,506,431 A    8/1924  Kegresse
3,841,424 A   10/1974  Purcell et al.
(Continued)

FOREIGN PATENT DOCUMENTS

CA    2479388    3/2006
CN    2395948    9/2000
(Continued)

OTHER PUBLICATIONS

Peter Hill. "Soft-Shoe Shuffle " iVT International Industrial Vehicle Technology Magazine, Jun./Jul. 2011, p. 26-30.
(Continued)

Primary Examiner — Jason R Bellinger
(74) Attorney, Agent, or Firm — Rickard K. DeMille; Rebecca L. Henkel

(57) ABSTRACT

The present invention is related to a track unit for a vehicle, such as an agricultural harvesting combine. The track unit according to a first embodiment of the invention comprises one or more bogies arranged between front and rear guide wheels. The bogies are provided with wheel pairs that are rotatably arranged about a longitudinal axis of the bogie itself, and are thereby capable of adapting individually to transversal oscillations caused by the terrain. Preferably, the bogies are furthermore equipped to adapt to longitudinal oscillations as well, by the longitudinal portion of the bogie being rotatable about a transversal axis. According to a second embodiment, the track unit of the invention is equipped with a cutter, non-rotatably mounted on one or both outer faces of the rear guide wheel, in a position where (Continued)

said wheel is in direct contact with the track, the cutter being configured to cut crop material that is transported upwards between the rear guide wheel and the track when the track unit moves forward.

20 Claims, 6 Drawing Sheets

(56) References Cited

U.S. PATENT DOCUMENTS

| | | | |
|---|---|---|---|
| 3,861,762 A | 1/1975 | Freedy et al. | |
| 4,120,372 A | 10/1978 | Hartwich | |
| 4,681,177 A | 7/1987 | Zborowski | |
| 5,409,075 A | 4/1995 | Nieman | |
| 5,452,949 A | 9/1995 | Kelderman | |
| 5,622,234 A | 4/1997 | Nagorcka et al. | |
| 5,899,543 A | 5/1999 | Lykken et al. | |
| 7,380,892 B2 | 6/2008 | Rosenboom | |
| 7,478,688 B2 | 1/2009 | Ki | |
| 7,533,741 B2 | 5/2009 | Brazier | |
| 7,726,749 B2 | 6/2010 | Rosenboom | |
| 7,740,084 B2 | 6/2010 | Rosenboom | |
| 8,118,374 B2 | 2/2012 | Canossa | |
| 8,342,257 B2 | 1/2013 | Rosenboom | |
| 8,763,716 B2 | 7/2014 | Rosenboom | |
| 9,440,691 B2 | 9/2016 | Rosenboom | |
| 9,828,047 B2 | 11/2017 | Eavenson, Sr. et al. | |
| 10,308,296 B2 * | 6/2019 | Piens | B62D 55/088 |
| 2005/0046277 A1 | 3/2005 | Simons et al. | |
| 2007/0181351 A1 | 8/2007 | Brazier | |
| 2012/0090903 A1 | 4/2012 | Bessette et al. | |

FOREIGN PATENT DOCUMENTS

| | | |
|---|---|---|
| CN | 2752135 | 1/2006 |
| DE | 2949942 | 12/1979 |
| EP | 2130749 A1 | 12/2009 |
| JP | 2010052549 | 3/2010 |
| SU | 1691210 | 11/1991 |
| WO | WO 9736778 | 10/1997 |

OTHER PUBLICATIONS

Peter Hill, "Wheels Vs. Tracks." iVT International Industrial Vehicle Technology Magazine, May/Jun. 2008. p. 32-38.

* cited by examiner

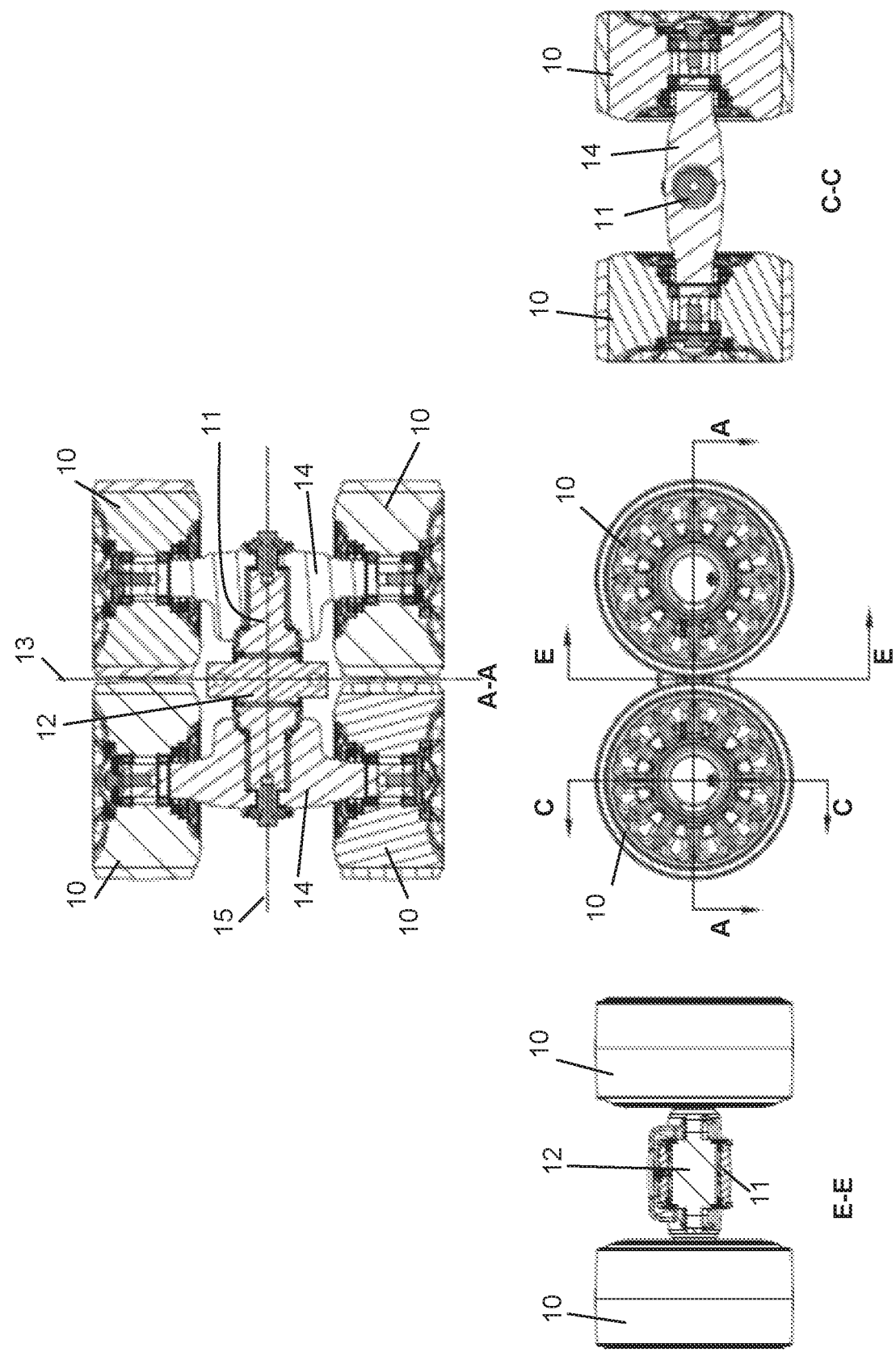

RUBBER TRACK UNIT FOR VEHICLE

CROSS-REFERENCE TO RELATED APPLICATIONS

This application is a continuation of U.S. application Ser. No. 14/896,206 (now U.S. Pat. No. 10,308,296), filed Dec. 4, 2015, which is a US National Stage filing of International Application Serial No. PCT/EP2014/061648, filed Jun. 5, 2014, which, in turn, claims priority to Belgium Application Serial No. BE2013/0395, filed Jun. 5, 2013, the disclosures of all of which are hereby incorporated by reference herein in their entirety for all purposes.

FIELD OF THE INVENTION

The present invention is related to a rubber track unit for use in vehicles, in particular for agricultural machines such as combine harvesters.

STATE OF THE ART

Depending on the type of terrain, agricultural machines may be mounted on wheels or on rubber tracks. In the latter case, at least one track unit is to be provided on each side of the machine, each unit comprising a drive sprocket mounted on one of the vehicle's axles, for driving the rotation of the track. A typical configuration is shown in EP-A-2130749, with the drive sprocket mounted centrally above a front and back guide wheel (also called idler wheel), and with a set of bogies equipped with bogie wheels arranged between the guide wheels. The track is in contact with the ground in the section defined by the guide wheels and the bogies. A degree of flexibility is required of the guide wheels and/or the bogies in order to prevent irregularities in the terrain from being transmitted to the drive axle and causing excessive strain thereon. Such flexibility is obtained in current track assemblies by a variety of measures, such as the use of flexible materials (as in EP-A-2130749), or the design of bogies which allow longitudinal oscillations of the bogie wheels, i.e. oscillations of said wheels about an axis that is oriented transversally to the vehicle's movement. An example of the latter solution is shown in US-A-2007/0181351. Although the latter design allows for transversal oscillations of the track unit as a whole, such transversal oscillations may still cause problems in terms of distributing the vehicle's weight, especially on highly uneven terrains.

Another problem occurring in track-equipped harvesting machines is that crop materials such as stalks and leaves are caught between the guide wheels and the rubber track, in particular between the rear guide wheels and the track. The crop material is then transported upward and threatens to accumulate in the track unit. Friction with the rotating belt threatens to heat up the accumulated material, leading to a potential fire hazard.

SUMMARY OF THE INVENTION

The invention is related to a track unit and to a vehicle as described in the appended claims. The track unit according to a first embodiment of the invention comprises one or more bogies arranged between front and rear guide wheels. The bogies are provided with wheel pairs that are rotatably arranged about a longitudinal axis of the bogie itself, and are thereby capable of adapting individually to transversal oscillations caused by the terrain. Preferably, the bogies are furthermore equipped to adapt to longitudinal oscillations as well, by the longitudinal portion of the bogie being rotatable about a transversal axis. According to a second embodiment, the track unit of the invention is equipped with a cutter, non-rotatably mounted on one or both outer faces of the rear guide wheel, in a position where said wheel is in direct contact with the track, the cutter being configured to cut crop material that is transported upwards between the rear guide wheel and the track when the track unit moves forward. The second embodiment with the cutter including all the variations described in this description may be combined with the first embodiment wherein the bogies are adapted to transversal oscillations, including all described variations of said first embodiment. The invention is also related to a track unit wherein only the first embodiment is applied and to a track unit wherein only the second embodiment is applied.

BRIEF DESCRIPTION OF THE FIGURES

FIG. 3 shows sectioned frontal, top and side views of the bogie 3o according to the embodiment also illustrated in FIG. 2.

DETAILED DESCRIPTION OF REFERRED EMBODIMENTS OF THE INVENTION

Preferred embodiments will now be described with reference to the drawings. The detailed description is not limiting the scope of the invention, which is defined only by the appended claims.

Figure 1:
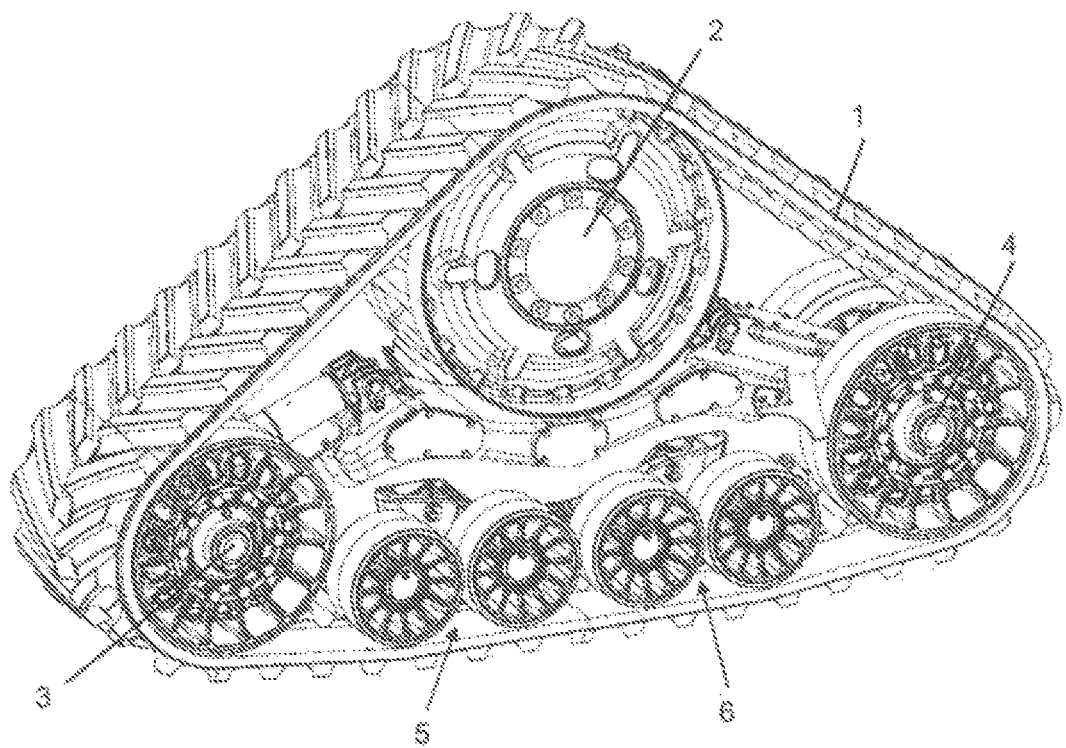
FIG. 1 shows a 3D-view of a track unit according to first embodiment of the invention.
Figure 2A:
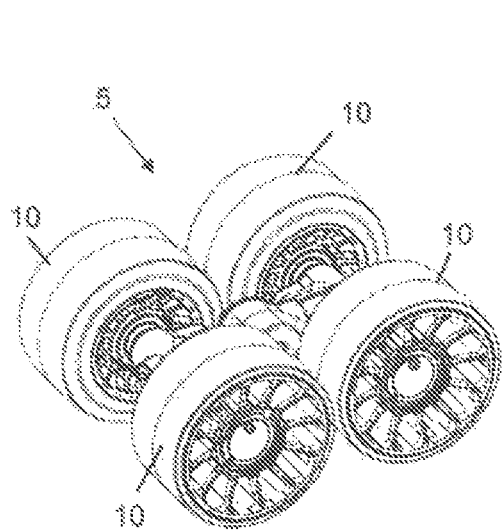
FIG. 2a shows a 3D-view of a bogie in a track unit according to the first embodiment.
Figure 2B:
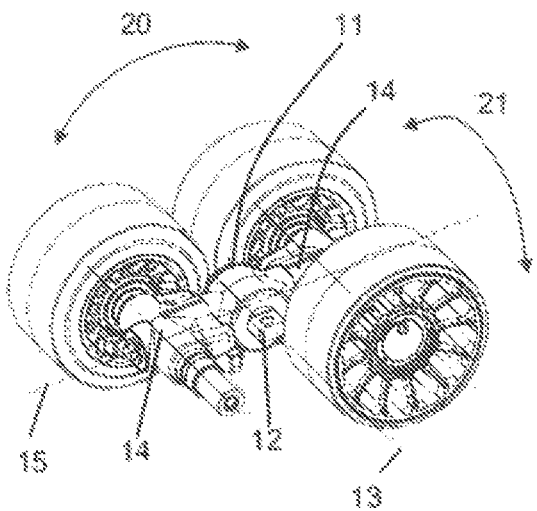
FIG. 2b shows the same bogie with one wheel removed, revealing a clearer picture of the components of the bogie.

FIG. 1 gives an overall image of a track unit according to the first embodiment of the invention. The rotation of the track 1 is driven by the drive sprocket wheel 2 and furthermore guided to move over the terrain by front and rear guide wheels 3 and 4 (also called idler wheels), and by two bogies 5 and 6. Each guide wheel comprises two parallel wheels mounted on the same axis. FIG. 2a illustrates the bogie 5 or 6 in more detail. The bogie comprises two pairs of bogie wheels 10, the wheels of each pair being mounted on either side of the bogie's longitudinal axis 15. As seen in FIG. 2b, the bogie comprises a central longitudinally arranged portion 11, that is rotatably mounted on a non-rotatable axle 12 oriented in the direction of transversal axis 13, extending between the two pairs of bogie wheels 10. The longitudinal portion 11 is rotatable about said transversal axis 13. On both ends of the longitudinal portion 11, a transversal axle portion 14 is mounted, each axle portion 14 being rotatable—with respect to the central longitudinal portion 11—about the bogie's longitudinal axis 15. The wheels 10 are rotatably mounted on the ends of the transversal axle portions 14. As seen in FIG. 1, the wheels 10 of the bogies are mounted lower than the guide wheels 3 and 4 so that in operation only the bogie wheels 10 are in contact with the ground. The track shown in FIG. 1 thus comprises two parallel front guide wheels 3, two parallel rear guide wheels 4 and eight bogie wheels, arranged four by four on two independently suspended bogies 5 and 6. With the guide wheels 3, 4 above the suspended bogies 5, 6, they do not need to be suspended too. Such a set up may lead to less wear and easier climbing in tough conditions.

The longitudinal portion's 11 freedom to rotate about the transversal axis 13 provides for the ability of each bogie to adapt to an unevenness of the terrain causing a longitudinal oscillation of the bogie (Indicated by arrow 20). The transversal axle portions' 14 freedom to rotate about the longitudinal axis 15 provides for the ability of each individual bogie to adapt to an unevenness of the terrain causing a transversal oscillation of the bogie (indicated by arrow 21).

Figure 4:
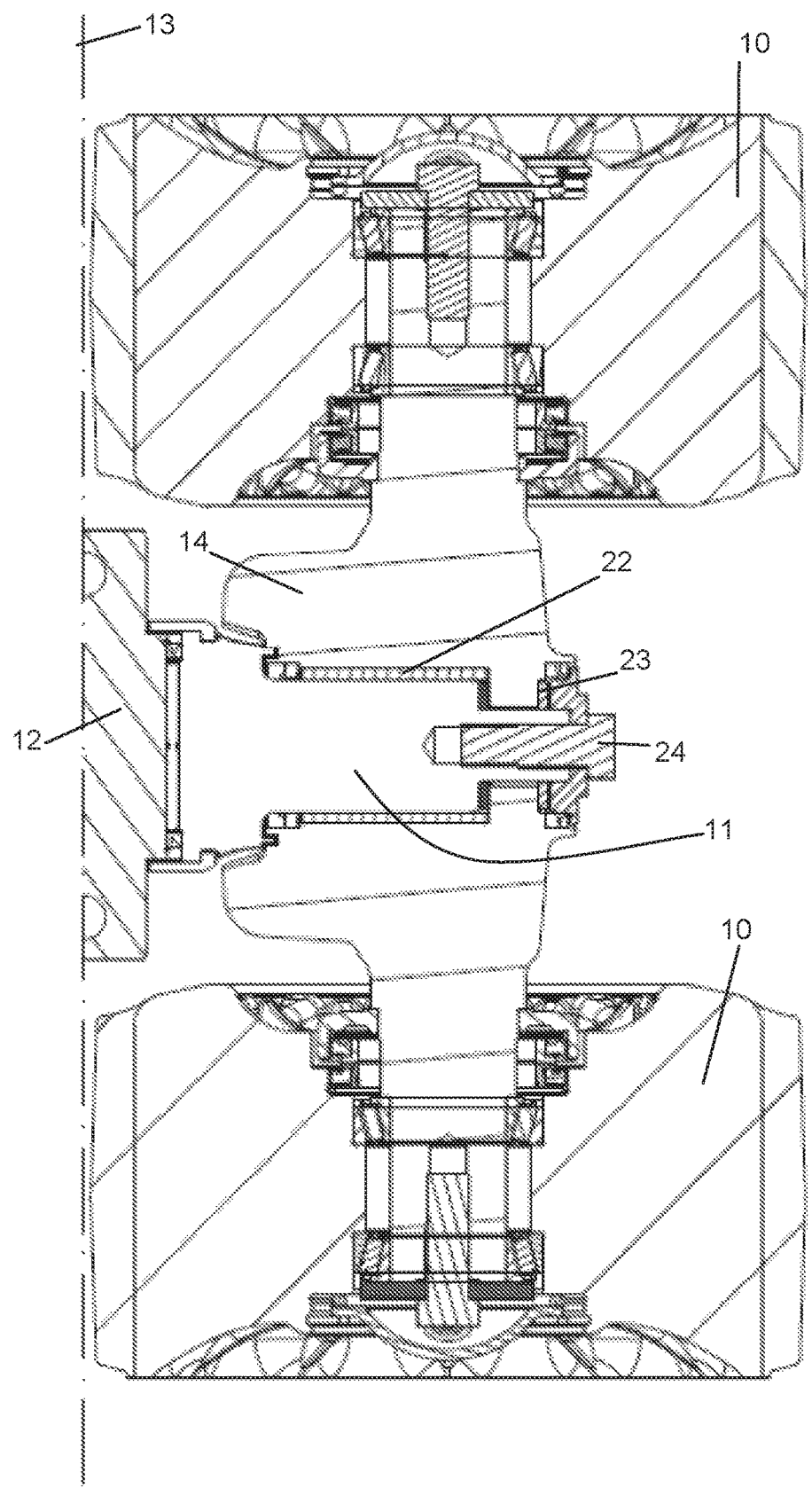
FIG. 4 shows a detail of the rotatable connection between an axle portion and the central longitudinal portion of a bogie in a track unit according to the embodiment of FIG. 2.

The various components and their interrelationship is shown in more detail in the sectioned views shown in FIG. 3. The attachment and/or rotation of parts with respect to other parts may be brought into practice by applying suitable bearing and attachment means known per se in the art. In the particular embodiment of FIG. 3, the assembly of the axle portions 14 onto the longitudinal portion 11 is shown in detail in FIG. 4. The axle portion 14 rotates about the central portion 11 via a plain bearing 22 and an axial roller bearing 23 and is maintained axially by the bolt connection 24. Other suitable types of bearings can be used instead of the above-described bearing types.

The rotation axes 13 and 15 are preferably located in the same horizontal plane, horizontal being defined as the orientation of the longitudinal axis 15 when the bogie is placed on an essentially flat horizontal surface.

Figure 5:
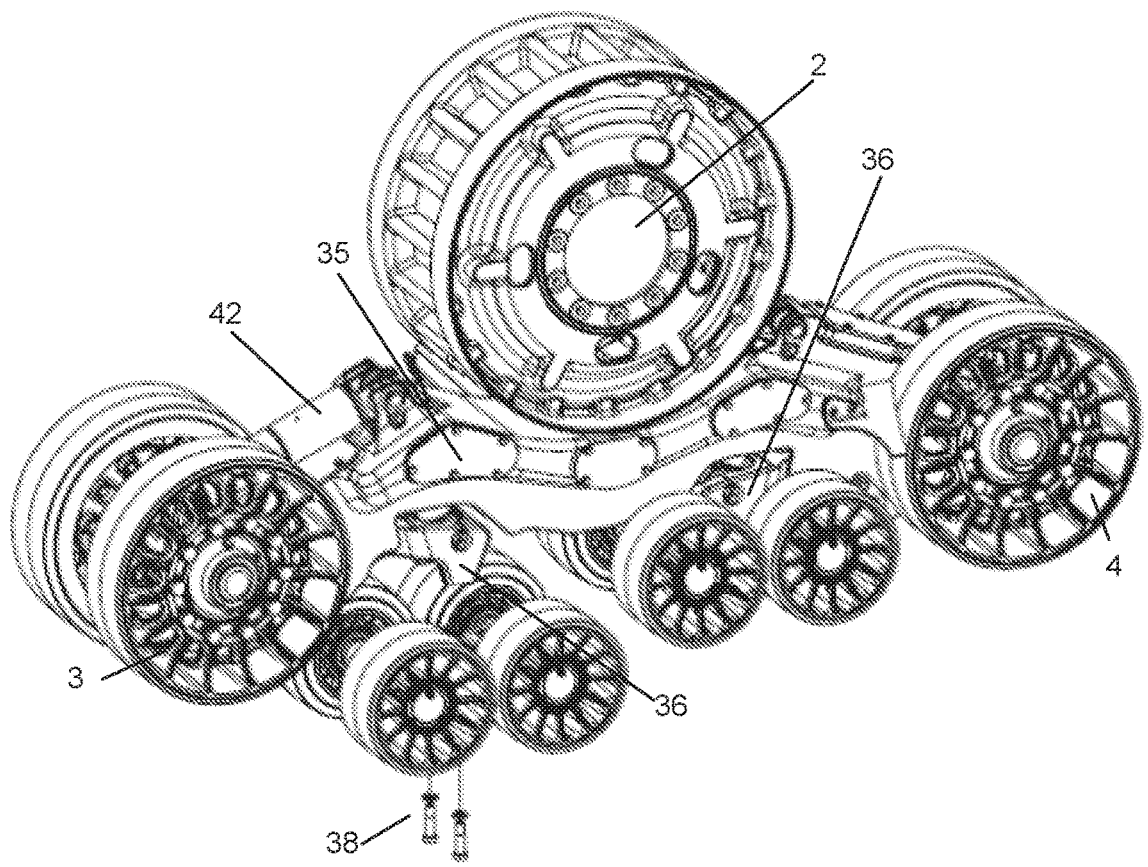
FIG. 5 illustrates the suspension of the bogies in a track unit according to the first embodiment of the invention.
Figure 6:
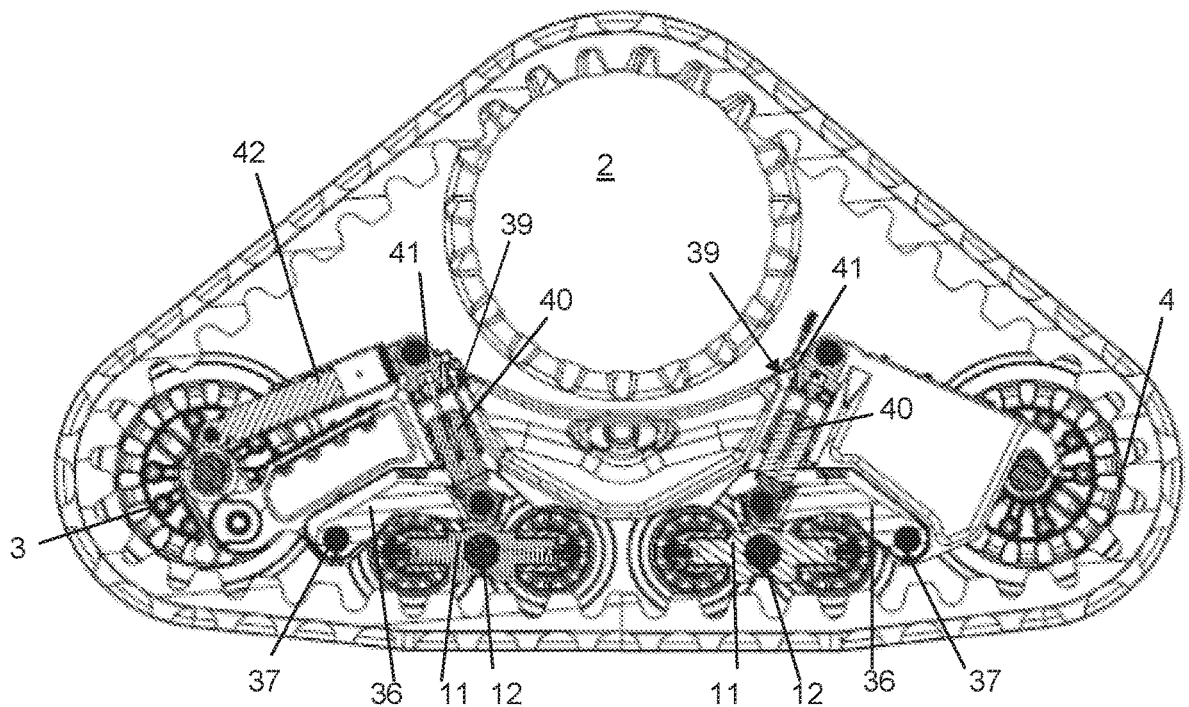
FIG. 6 shows a sectioned side-view of a track unit according to the embodiment of FIG. 5, illustrating more in detail the suspension of the bogies.

The bogies 5 and 6 are suspended independently from each other from the chassis 35 of the track unit. The suspension of each bogie to the chassis 35 is illustrated in FIGS. 5 and 6. A support bracket 36 is mounted on the chassis. At one end, the bracket is mounted so as to be rotatable about transversal axis 37, located to one side of the bogie. Starting from said transversal axis, the bracket reaches over above the bogie, towards the middle section of the bogie, where the other end of the bracket is bolted by two bolt connections 38 to the outer ends of the non-rotating axle 12. On top of the bolt connection 38, the support bracket 36 is connected to the movable end 40 of a hydraulic adjustable length actuator 39. The non-movable end 41 of the said actuator is fixed to the chassis 35. The actuator 39 is configured to exert a downward force on the bogie. Another actuator 42 is visible in FIGS. 5 and 6, configured to exert a tensioning force on the front guide wheel 3.

The invention is not limited to the embodiment shown in the drawings. A 1o track unit of the invention is characterized in the first place by the freedom of the bogie wheels 10 to rotate about the longitudinal axis 15 of the bogie itself, so that each bogie is capable individually of adapting to transversal oscillations. Preferably each pair of wheels is rotatable separately about said axis (e.g. by the axle portions 14 in the embodiment of FIG. 3), but alternatively, sets of more than two wheel pairs could be arranged to be rotatable simultaneously about the longitudinal axis 15. The preferred embodiment involves bogies which allow simultaneously:
the rotation of the wheel pairs about said longitudinal axis 15 and the rotation of the longitudinal portion 11 onto which the wheels are mounted, about a transversal axis 13 extending between two pairs of wheels.

The most preferred option shows a bogie wherein the longitudinal and transversal axes are lying in the same horizontal plane as defined above for the embodiment shown in the drawings. Instead of a suspension of the bogies by hydraulic actuators 39, pneumatic actuators or any other suitable suspension means may be used.

Figure 7:
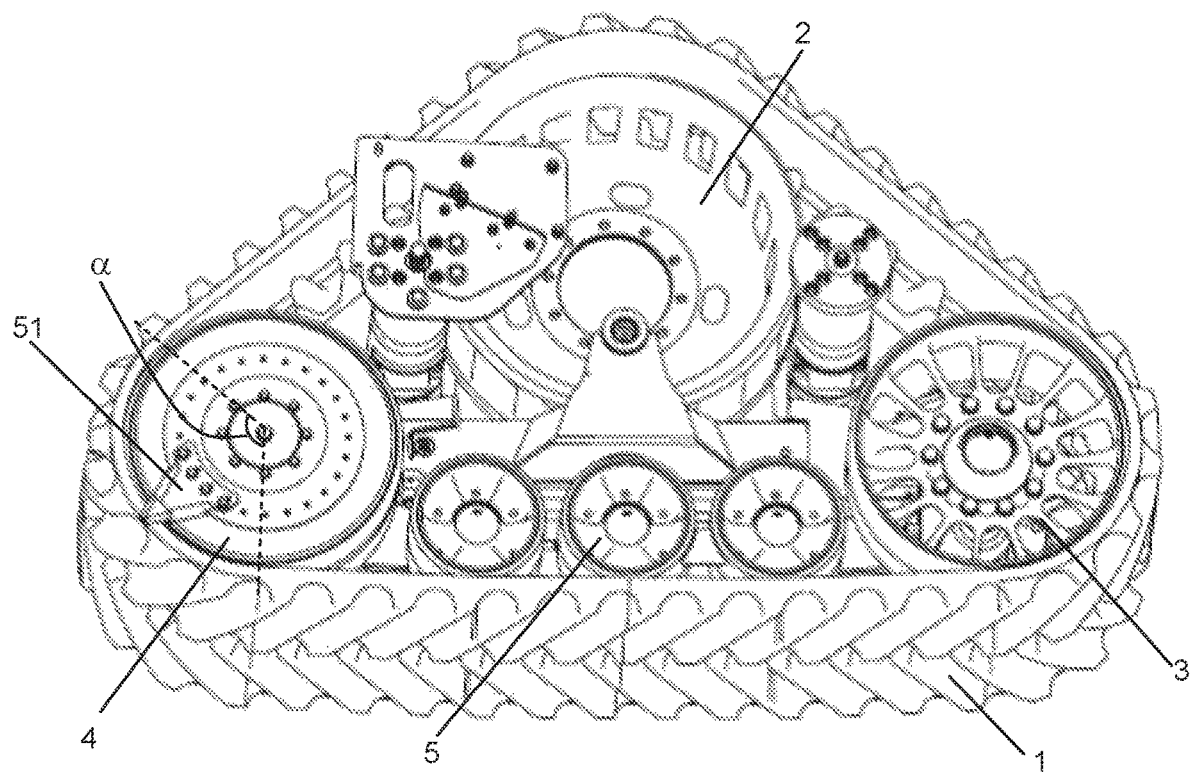
FIG. 7 illustrates the second embodiment according to the invention, wherein a cutter is mounted on one of the guide wheels of the track unit.
Figure 8:
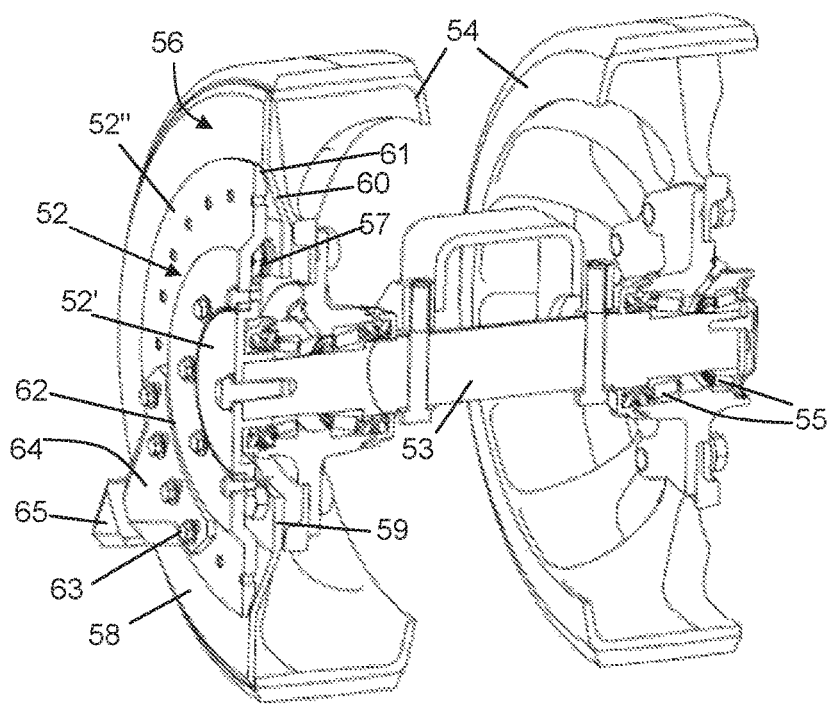
FIG. 8 shows a detail of the cutter according to a preferred embodiment.
Figure 9:
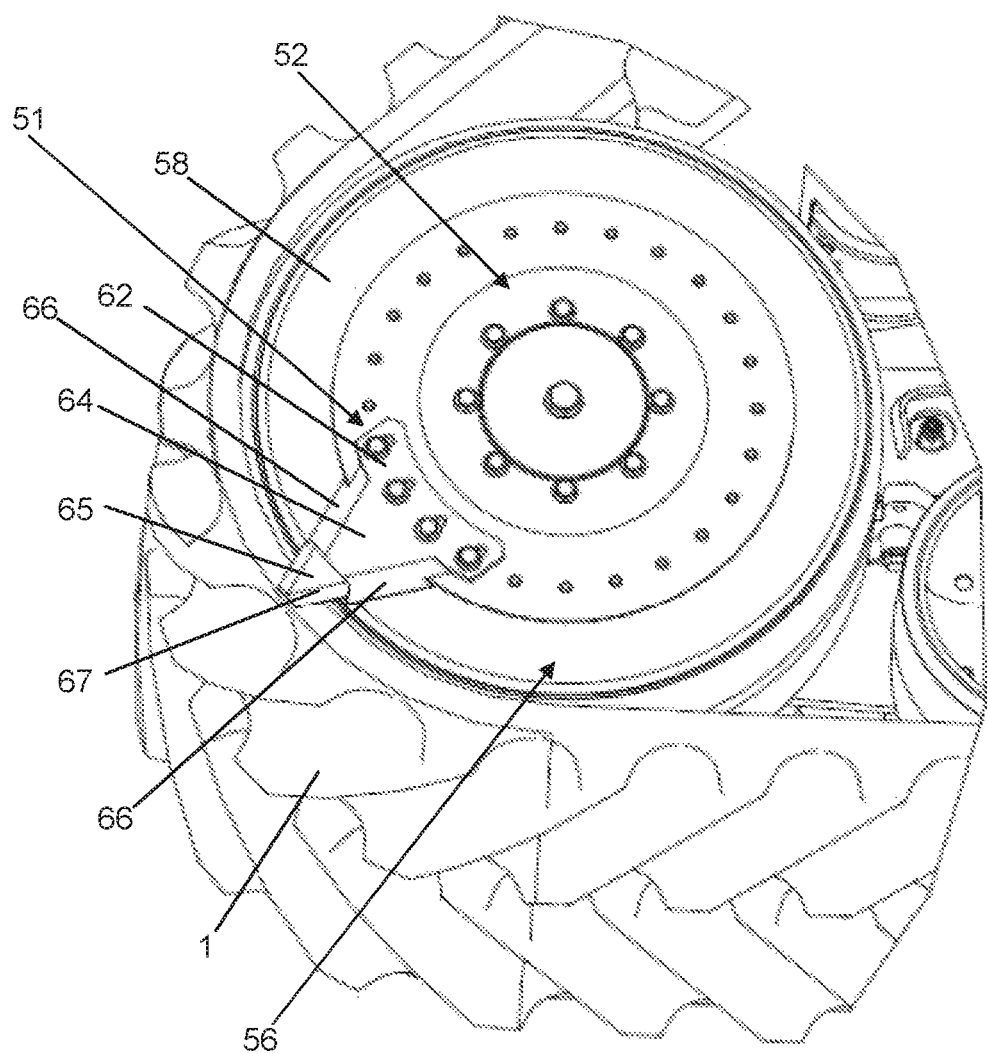
FIG. 9 shows a detail of the cutter in a track unit according to the second embodiment of the invention.

The second embodiment according to the invention is shown in FIGS. 7 to 9. This concerns a track unit comprising a track 1, a drive sprocket 2, front and rear guide wheels 3 and 4, and a 6-wheel bogie 5. In the track unit according to this embodiment, a cutter 51 is non-rotatably mounted on the rear guide wheel 4, in a position where the guide wheel is in direct contact with the track, i.e. within the arc denoted as α in FIG. 7. The guide wheel 4 in this particular embodiment is in fact a guide wheel assembly comprising a set of two parallel wheels 54 which are rotatable about a non-rotatable axle 53, via suitably mounted roller bearings 55, see FIG. 8. The cutter 51 is bolted to a circular plate 52 consisting of inner and outer portions 52'/52". The plate 52 may also be a single piece. The plate 52 is bolted to the end face of the non-rotatable axle 53 so as not to rotate together with the wheels 54. The cutter 51 is thereby immovably connected to the non-rotatable axle 53. A circular side-plate 56 is furthermore fixed to one of the wheels 54, i.e. side plate 56 rotates together with the wheels 54. The side plate 56 is concentric with the fixed plate 52 and has a larger diameter than said fixed plate 52. The side-plate 56 has:
  an outer ring-portion 58 that extends radially outward from the fixed plate 52, while being arranged flush with said fixed plate 52,
  an inner ring portion 59 that is bolted to the wheels via bolts 57, while lying inward axially with respect to the fixed plate 52 (i.e. underneath said fixed plate 52),
  a conical portion 60 that connects the outer and inner ring portions 58/59. The rim of the fixed plate 52 has a conical surface 61 at the side that faces the edge of the conical portion 60 of the side-plate 56. The clearance between the fixed plate 52 and the side plate 56 along said conical surface is small enough to prevent crop material from entering said clearance and large enough to allow the rotation of the side plate 56 with respect to the fixed plate 52.

The cutter 51 itself (see FIG. 9) is triangular in shape and extends radially outward from an edge section of the fixed plate 52 towards the track 1, with a base edge 62 fixed by bolts 63 to the fixed plate 52, a central portion 64 overlapping the ring-portion 58 of the side plate 56 and a tip portion 65 overlapping the side of the track 1. During movement of the track unit, the cutter 51 and fixed plate 52 remain stationary in terms of rotation about the axle 53, while the track 1 and the side plate 56 rotate together with the guide wheel 54. Stalks and leaves that are caught between the wheel 54 and the rubber track are thus transported upward towards the position of the cutter 51 where they are cut by the edges of the cutter, so that an accumulation of crop material in the interior of the track unit is prevented.

In the embodiment shown, the central portion 64 of the cutter comprises slanted lateral strips 66 that are in close proximity to the side plate 56. The tip 65 is profiled outwardly with respect to the central portion 64, thereby following the profile of the track 1 with respect to the side plate 56. The tip portion 65 is equally provided with slanted side strips 67 which remain in close proximity to the side of the track 1 during operation of the track unit.

The cutter assembly according to the invention may differ in a number of details compared to the embodiment shown in the drawings. The location of the cutter may be chosen anywhere along the arc α shown in FIG. 7. The shape of the cutter 51 may differ from the triangular shape, as long as the cutter is configured to cut crop materials being transported upward to the location of the cutter.

The invention claimed is:

1. A track unit for a vehicle, comprising:
   a track;
   a drive wheel configured to drive the track;
   a chassis; and
   at least one bogie suspended from the chassis, the at least one bogie comprising:
     a longitudinal portion extending along a longitudinal axis of the at least one bogie;
     a first axle portion coupled to the longitudinal portion; and
     a first pair of bogie wheels coupled to the first axle portion, the first pair of bogie wheels being supported for rotation relative to the first axle portion about a first wheel rotational axis extending transverse to and intersecting the longitudinal axis;
   wherein the first axle portion is pivotably coupled to the longitudinal portion such that the first axle portion is pivotable relative to the longitudinal portion about the longitudinal axis.

2. The track unit of claim 1, further comprising a second axle portion coupled to the longitudinal portion and a second pair of bogie wheels coupled to the second axle portion, the second pair of bogie wheels being supported for rotation relative to the second axle portion about a second wheel rotational axis extending transverse to and intersecting the longitudinal axis, the second axle portion being pivotably coupled to the longitudinal portion such that the second axle portion is pivotable relative to the longitudinal portion about the longitudinal axis.

3. The track unit of claim 2, wherein the first and second axle portions are independently coupled to the longitudinal portion such that the first axle portion is configured to pivot relative to the longitudinal portion about the longitudinal axis independent of the second axle portion.

4. The track unit of claim 2, wherein the longitudinal portion includes a first end and an opposed second end and extends along the longitudinal axis between the first and second ends, the first axle portion being pivotably coupled to the first end of the longitudinal portion and the second axle portion being pivotably coupled to the second end of the longitudinal portion.

5. The track unit of claim 1, wherein the longitudinal portion is supported relative to the chassis for pivoting about a transversal axis extending perpendicular to the longitudinal axis.

6. The track unit of claim 5, wherein the transversal axis and the longitudinal axis are located in a common plane.

7. A track unit for a vehicle, comprising:
   a track;
   a drive wheel configured to drive the track;
   a chassis; and
   at least one bogie suspended from the chassis, the at least one bogie comprising:
     a longitudinal portion extending along a longitudinal axis of the at least one bogie, the longitudinal portion being supported relative to the chassis for pivoting about a transversal axis separate from the longitudinal axis;
     a first axle portion coupled to the longitudinal portion; and
     a first pair of bogie wheels coupled to the first axle portion, the first axle portion being pivotably coupled to the longitudinal portion such that the first axle portion is pivotable relative to the longitudinal portion about the longitudinal axis,
   wherein the transversal axis and the longitudinal axis are located in a common plane.

8. The track unit of claim 7, wherein the first pair of bogie wheels are supported for rotation relative to the first axle portion about a first wheel rotational axis extending transverse to and intersecting the longitudinal axis.

9. The track unit of claim 7, wherein the transversal axis is oriented perpendicular to the longitudinal axis.

10. The track unit of claim 7, further comprising a second axle portion coupled to the longitudinal portion and a second pair of bogie wheels coupled to the second axle portion, the second axle portion being pivotably coupled to the longitudinal portion such that the second axle portion is pivotable relative to the longitudinal portion about the longitudinal axis.

11. The track unit of claim 10, wherein the second pair of bogie wheels is supported for rotation relative to the second axle portion about a second wheel rotational axis extending transverse to and intersecting the longitudinal axis.

12. The track unit of claim 10, wherein the first and second axle portions are independently coupled to the longitudinal portion such that the first axle portion is configured to pivot relative to the longitudinal portion about the longitudinal axis independent of the second axle portion.

13. The track unit of claim 7, wherein the longitudinal portion includes a first end and an opposed second end and extends along the longitudinal axis between the first and second ends, the first axle portion being pivotably coupled to the first end of the longitudinal portion and the second axle portion being pivotably coupled to the second end of the longitudinal portion.

14. A track unit for a vehicle, comprising:
   a track;
   a drive wheel configured to drive the track;
   a chassis;
   front and rear guide wheels coupled to the chassis;
   a front support bracket;
   a front bogie coupled to the front support bracket, the front support bracket including a first end coupled to a portion of the front bogie and a second end pivotably supported relative to the chassis at a pivot point defined between the front guide wheel and the front bogie;
   a rear support bracket; and
   a rear bogie coupled to the rear support bracket, the rear support bracket including a first end coupled to a portion of the rear bogie and a second end pivotably supported relative to the chassis at a pivot point defined between the rear guide wheel and the rear bogie;
   wherein the front and rear support brackets independently suspend the front and rear bogies, respectively, relative to the chassis.

15. The track unit of claim 14, further comprising a front actuator coupled between the chassis and the front support bracket, the front actuator configured to apply a downward force on the front bogie.

16. The track unit of claim 15, further comprising a rear actuator coupled between the chassis and the rear support bracket, the rear actuator configured to apply a downward force on the rear bogie.

17. The track unit of claim 14, wherein at least one of the front bogie or the rear bogie comprises:
- a longitudinal portion extending along a longitudinal axis of the at least one of the front bogie or the rear bogie;
- an axle portion; and
- a pair of bogie wheels coupled to the axle portion, the axle portion being pivotably coupled to the longitudinal portion such that the axle portion is pivotable relative to the longitudinal portion about the longitudinal axis.

18. The track unit of claim 17, wherein the pair of bogie wheels is supported for rotation relative to the axle portion about a wheel rotational axis extending transverse to and intersecting the longitudinal axis.

19. The track unit of claim 17, wherein the longitudinal portion is supported relative to the chassis for pivoting about a transversal axis extending perpendicular to the longitudinal axis.

20. The track unit of claim 19, wherein the transversal axis and the longitudinal axis are located in a common plane.

* * * * *